United States Patent [19]

Kajihara

[11] Patent Number: 4,946,140

[45] Date of Patent: Aug. 7, 1990

[54] SYSTEM FOR AUTOMATICALLY FEEDING CHEMICAL LIQUIDS TO COOLING TOWERS

[75] Inventor: Kunihito Kajihara, Yokohama, Japan

[73] Assignee: Michio Toyomasu, Kawasaki, Japan

[21] Appl. No.: 340,464

[22] Filed: Apr. 19, 1989

[30] Foreign Application Priority Data

Apr. 21, 1988 [JP] Japan .................................. 63-52741

[51] Int. Cl.⁵ .............................................. B01F 3/04
[52] U.S. Cl. ...................................... 261/18.1; 261/68; 261/70; 261/DIG. 46; 137/895
[58] Field of Search ............... 237/895; 261/DIG. 46, 261/18.1, 67, 68, 70

[56] References Cited

U.S. PATENT DOCUMENTS

| Re. 25,037 | 9/1961 | Brazier | 137/895 |
|---|---|---|---|
| 2,785,012 | 3/1957 | Frewin | 137/895 |
| 3,196,892 | 7/1965 | Savage et al. | 261/DIG. 46 |
| 3,332,871 | 7/1967 | Robinson | 261/DIG. 46 |
| 4,259,269 | 3/1981 | Flowers | 261/DIG. 46 |

Primary Examiner—Tim Miles
Attorney, Agent, or Firm—Fidelman & Wolffe

[57] ABSTRACT

A system for automatically feeding a chemical liquid to a cooling tower includes a water reservoir for storing water circulating through the cooling tower, a water feeding pipe extending into said water reservoir, a float valve provided in a passage of said water-feeding pipe, which is actuated in response to a variation in a water level in said water reservoir to open or close said passage, a means for increasing the flow rate of water flowing through said passage to inject water from a discharge port at the time when said float valve opens, a negative pressure generating chamber located in said passage and defined by said injection of water and a chemical liquid pipe in communication with said negative pressure generating chamber. A chemical liquid in the chemical liquid pipe is injected with water from the discharge port through the negative pressure generating chamber under the action of a negative pressure generated therein.

4 Claims, 3 Drawing Sheets

FIG. I

SYSTEM FOR AUTOMATICALLY FEEDING CHEMICAL LIQUIDS TO COOLING TOWERS

BACKGROUND OF THE INVENTION

1 Field of the Invention

The present invention relates to a system for automatically feeding a chemical liquid to water circulating through a heat exchange circuit in a cooling tower so as to prevent red rust and/or fur from occurring in the circulating water.

2 Statement of the Prior Art

Such systems heretofore available in the art are broken down into large, medium and small sizes, and all rely upon automatic water-feeding means comprising a float valve or the like provided in a water reservoir, which is actuated to sense a reduction in a water level therein and return the water level to the predetermined level so as to constantly maintain a given amount of water circulating through a heat exchange circuit in a cooling tower.

In the system of a large size, an electrically operated pump in operative association with such automatic water-feeding means is actuated to feed the predetermined amount of a chemical liquid on regular or automatic basis.

In the systems of medium and small sizes, however, it is still required for maintenance workers to feed a chemical liquid in a manual manner.

With the large-sized system it is possible to regularly feed a specific quantity of a chemical liquid to a water reservoir in which circulating water is stored. However, additional provision of an electrically operated pump needs additional facilities and costs. On the other hand, the medium- and small-sized systems are now under pressure of increased initial investment.

Of the medium- and small-sized systems, some systems relying upon maintenance workers are inexpensive as compared with systems relying upon electrically operated pumps. Since cooling towers are generally installed on elevated spots such as the roofs of high buildings, however, not only is feeding work dangerous but also difficulty is encountered in regular feeding of a constant amount of a chemical liquid due to the need of man power.

SUMMARY OF THE INVENTION

A primary object of the present invention is to provide a system which can make use of a simple automatic water feeding means known in the art to automatically feed the predetermined amount of a chemical liquid depending upon the amount of water supplied during automatic circulating water feeding, whereby the predetermined porportion of a chemical liquid is always maintained in water circulating through a heat exchange circuit.

A second object of the present invention is to provide a system which is of a very simple and inexpensive structure and can be easily attached to an existing cooling tower with no need of using costly units such as electrically operated pumps, power sources or other power.

According to the present invention, the above objects are achieved by the provision of a system for automatically feeding a chemical liquid to a cooling tower which includes a water reservoir for storing water circulating through the cooling tower, a water feeding pipe extending into said water reservoir, a float valve provided in a passage of said water-feeding pipe, which is actuated in response to a variation in a water level in said water reservoir to open or close said passage, a means for increasing the flow rate of water flowing through said passage to inject water from a discharge port at the time when said float valve opens, a negative pressure generating chamber located in said passage and defined by said injection of water and a chemical liquid pipe in communication with said negative pressure generating chamber, a chemical liquid in said chemical liquid pipe being injected with water from said discharge port through said negative pressure generating chamber under the action of a negative pressure generated in said negative pressure generating chamber.

BRIEF DESCRIPTION OF THE DRAWINGS

The present invention will now be explained in more detail with reference to a preferred embodiment illustrated in the accompanying drawings, which are given for the purpose of illustration alone and in which.

DETAILED DESCRIPTION OF THE INVENTION

Figure 1:
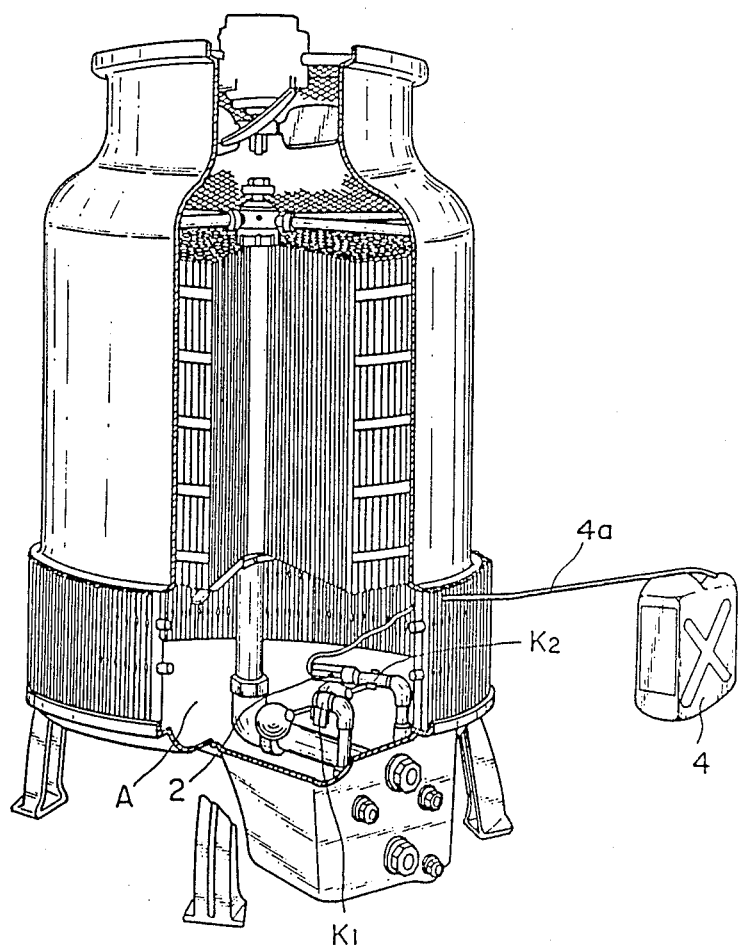
FIG. 1 is a partly cut away, perspective view of the system according to the present invention, which is attached to a cooling tower.
Figure 2:
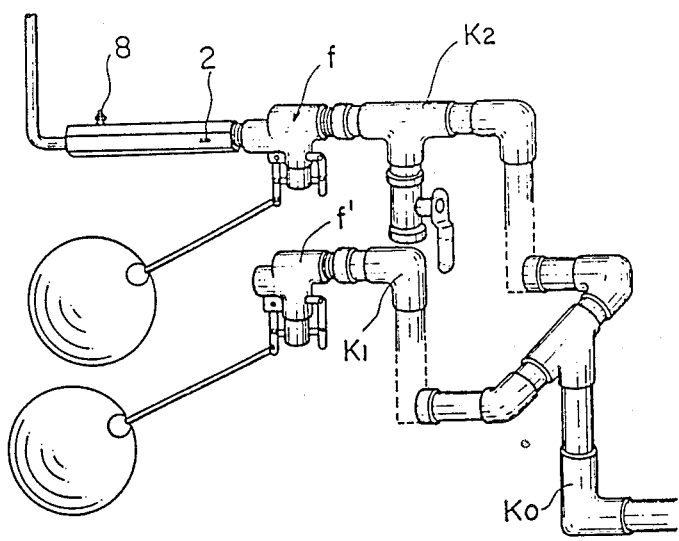
FIG. 2 is an enlarged perspective view of the present system.
Figure 3:
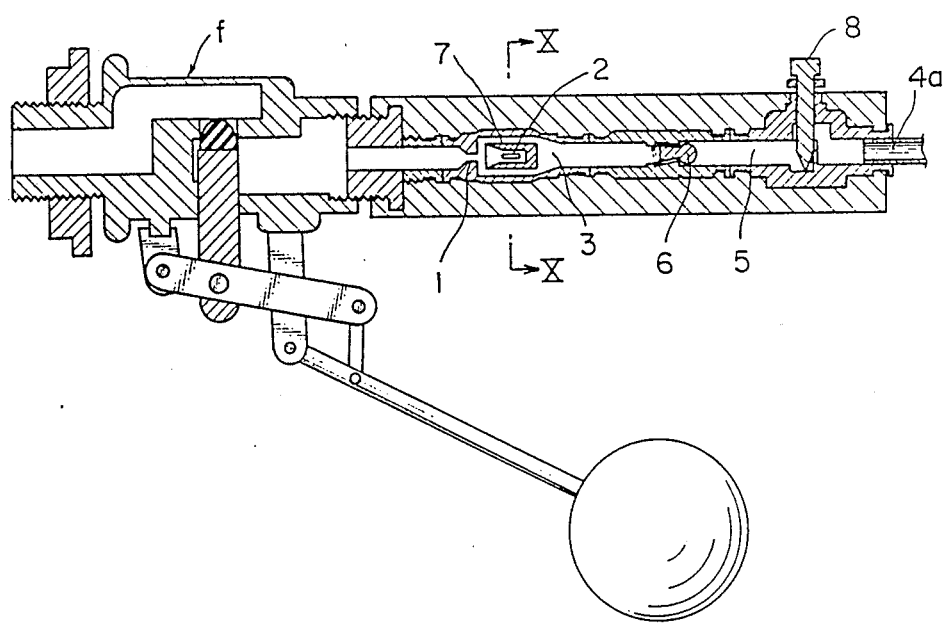
FIG. 3 is a sectional view illustrative of part of the present invention.
Figure 4:
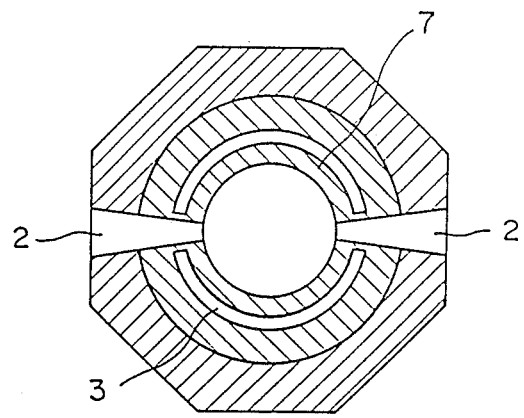
FIG. 4 is a sectional view taken along the line X—X of FIG. 3.

For a better understanding of the present invention, the present invention will now be described with reference to one illustrated embodiment.

There is provided a water reservoir A for storing water circulating through a cooling lower. Disposed within the water reservoir A is a main water feeding pipe $K_0$ from which two water-feeding pipes $K_1$ and $K_2$ are branched. Each of the pipes $K_1$ and $K_2$ is provided with a float valve f', f, respectively. One float valve f communicates on its outlet side with a vacuum (negative pressure) generating chamber 3 through a Venturi tube 1, which chamber is provided with a discharge port 2.

Outside the water reservoir A, there is a chemical liquid tank 4, which in turn communicates with a guide passage 5 via a pipe 4a. That guide passage communicates with the negative pressure generating chamber 3. A check valve 6 is provided on the guide passage 5, and a differential flow member 7 is located on the side of the Venturi tube 1 in the negative pressure generating chamber 3. A valve 8 is also provided for the flow regulation of a chemical liquid.

In the system of the above structure, water is fed to the water reservoir A through the pipe $K_1$ and the float valve f'.

More specifically, when the water level in the water reservoir A lowers until the float valve f' opens, the water is fed to the water reservoir A through the water-feeding pipe $K_1$. At the same time, the float valve f of the water-feeding pipe $K_2$ opens, and the water leaving the outlet side of the float valve f passes through the Venturi tube 1 wherein its flow rate is so increased that it is injected into the water reservoir from the discharge port 2 of the differential flow member 7. By such injection of water, a negative pressure is generated in the negative pressure generating chamber 3, so that the check valve 6 opens to suck a chemical liquid from the tank 4 to the chamber 3 and feed it from the discharge port 2 into the water tank.

Since the amount of water in the water-feeding pipe $K_1$ is larger than that in the water-feeding pipe $K_2$, the float valve f' closes upon the water level in the water reservoir rising to the predetermined level, so that the water feeding is stopped simultaneously with closing of the float valve f, thus resulting in the feeding of the chemical liquid being stopped.

According to the automatic chemical liquid-feeding system according to the present invention, a chemical liquid is sucked and fed into the water reservoir under the action of a negative pressure generated by the injection of a part of water fed into the water reservoir. Thus, considerable reductions in the initial investment are achievable as compared with a means for feeding a chemical liquid with the use of a pump.

Of the two water-feeding pipes, one pipe serves to feed water into the water reservoir and the other functions to generate a negative pressure for feeding a chemical liquid. It is thus possible to keep constant the concentration of a chemical liquid in the water reservoir with no fear of feeding the chemical liquid in excess, and to make maintenance and control extremely easy.

Moreover, the present invention can be easily carried out with some modifications of a water-feeding system of an existing water reservoir.

It is understood that the above described embodiment is simply illustrative of the application of principles of the invention and many other modifications may be made without departing from the spirit and scope of the invention.

The embodiments of the invention in which an exclusive property or privilege is claimed are defined as follows.

1. A system for automatically feeding a chemical liquid to a cooling tower comprising:
 a water reservoir for storing water circulating through the cooling tower;
 a water feeding pipe extending into said water reservoir;
 a float valve provided at a portion of said water feeding pipe, which is actuated in response to a variation in a water level in said water reservoir to open or close a passage within said water feeding pipe;
 a means for increasing the flow rate of water flowing through said water feeding pipe to inject water from a discharge port at the time when said float valve opens said passage, said means for increasing the flow rate being enclosed within said water feeding pipe and located downstream from said passage;
 a negative pressure generating chamber enclosed within said water feeding pipe and located in the vicinity of said discharge port, wherein negative pressure is generated in said negative pressure generating chamber by said injection of water from the discharge port; and
 a chemical liquid pipe in communication with said negative pressure generating chamber;
 a chemical liquid in said chemical liquid pipe being injected with water from said discharge port after passing through said negative pressure generating chamber under the action of a negative pressure generated in said negative pressure generating chamber.

2. The system as claimed in claim 1, wherein two water feeding pipes are extended into said water reservoir, a first water feeding pipe serving to generate a negative pressure for feeding a chemical liquid, and a second water feeding pipe serving solely as a water feeding pipe and being provided with a float valve.

3. The system as claimed in claim 1, further including a chemical liquid check valve between said negative pressure generating chamber and said chemical liquid pipe.

4. The system as claimed in claim 1, wherein the discharge port is situated such that injection of water and chemical liquid from the discharge port is at an axial direction in relation to a flow of water through said means for increasing the flow rate.

* * * * *